(12) United States Patent
Horvath (10) Patent No.: US 6,510,817 B2
(45) Date of Patent: Jan. 28, 2003

(54) MOUSE AND CHEESE CAT TOY

(75) Inventor: Tibor Horvath, Springfield, NJ (US)

(73) Assignee: Ethical Products, Inc., Newark, NJ (US)

( * ) Notice: Subject to any disclaimer, the term of this patent is extended or adjusted under 35 U.S.C. 154(b) by 0 days.

(21) Appl. No.: 09/866,407

(22) Filed: May 25, 2001

(65) Prior Publication Data

US 2002/0174839 A1 Nov. 28, 2002

(51) Int. Cl.⁷ .............................................. A01K 29/00
(52) U.S. Cl. ........................ 119/707; 119/706; 119/711
(58) Field of Search ............................... 119/707, 708, 119/710, 711; 273/141 R, 368, 369; 446/159, 199, 176, 180, 185, 186, 197, 198, 217, 218, 281, 287

(56) References Cited

U.S. PATENT DOCUMENTS

| | | | | |
|---|---|---|---|---|
| 369,404 A | * | 9/1887 | Heston et al. ........... 273/141 R |
| 3,906,662 A | * | 9/1975 | Suzuki et al. .................. 126/66 |
| 4,174,588 A | * | 11/1979 | Clanton .................. 273/142 R |
| 4,272,909 A | * | 6/1981 | Tsui ........................... 446/472 |
| 4,292,755 A | * | 10/1981 | Houn ......................... 446/176 |
| 4,534,316 A | * | 8/1985 | Bowlsby ..................... 119/707 |
| 5,103,770 A | * | 4/1992 | Berkovich et al. .......... 119/708 |
| 5,255,631 A | * | 10/1993 | Anderson .................. 119/52.2 |
| 5,390,629 A | * | 2/1995 | Simone ...................... 119/711 |
| 5,579,726 A | * | 12/1996 | Boshears .................... 119/706 |
| 5,634,435 A | * | 6/1997 | Udelle et al. ............... 119/706 |
| 5,806,465 A | * | 9/1998 | Baiera et al. ............... 119/707 |
| 5,875,736 A | * | 3/1999 | Udelle et al. ............... 119/706 |
| 6,174,216 B1 | * | 1/2001 | Chianese .................... 446/320 |

* cited by examiner

Primary Examiner—Charles T. Jordan
Assistant Examiner—Tara M Golba
(74) Attorney, Agent, or Firm—Katten Muchin Zavis Rosenman (57) ABSTRACT

A toy for a cat, which comprises a simulated mouse with a simulated cheese face, presents a continuous attraction for a cat because of the movable nature of the simulated mouse which is propelled during operation of the toy to appear in various locations relative to the simulated cheese face.

47 Claims, 9 Drawing Sheets

MOUSE AND CHEESE CAT TOY

BACKGROUND OF THE INVENTION

1. Field of the Invention

This invention relates to toys for animals and in particular to toys for cats.

2. Description of the Related Art

Toys for animals exist in all shapes and sizes. However, the problem with many of these toys is that they lack realism or lasting attractiveness to the animal. Hence, the animal will play with the toy for a little while, but typically become bored and soon require other distractions. This can lead to the undesirable consequence of the animal wandering off or engaging in undesirable activity, such as causing damage or destruction to valuable property.

In particular, balls or other objects that are either chewable or allow a cat to grasp them with its claws have often been used as toys for cats. The same problem exists with regard to these cat toys as with other animal toys, in that a cat can soon become bored with the toy due to its lack of relation to any realistic cat activity or attractiveness to the cat, thus causing the cat to wander off or become involved in other destructive or undesirable activities. Thus, there exists a need for a toy for cats with a realistic relation to actual feline activities, which will produce an enduring distraction to continue to attract the cat and cause it to play with the toy on a continuing basis. Such a continuously attractive toy will prevent the cat from wandering off or otherwise engaging in undesirable activities.

SUMMARY OF THE INVENTION

The invention comprises a realistic appearing mouse and cheese apparatus which can provide continuing and realistic amusement for a cat.

The invention solves the problems inherent in prior art toys by providing a cat with an attractive and realistic distraction on a continuing basis and which bears a relation to actual feline activities. The cat thus will be amused for long periods of time and will be prevented from wandering off or engaging in other undesirable activities.

The object of the invention, therefore, is to provide a realistic and continuing source of amusement for a cat.

A further object of the invention is to prevent a cat from wandering about out of the control of its owner or otherwise engaging in undesirable activities, such as damage or destruction to property.

DETAILED DESCRIPTION OF THE INVENTION

Figure 1:
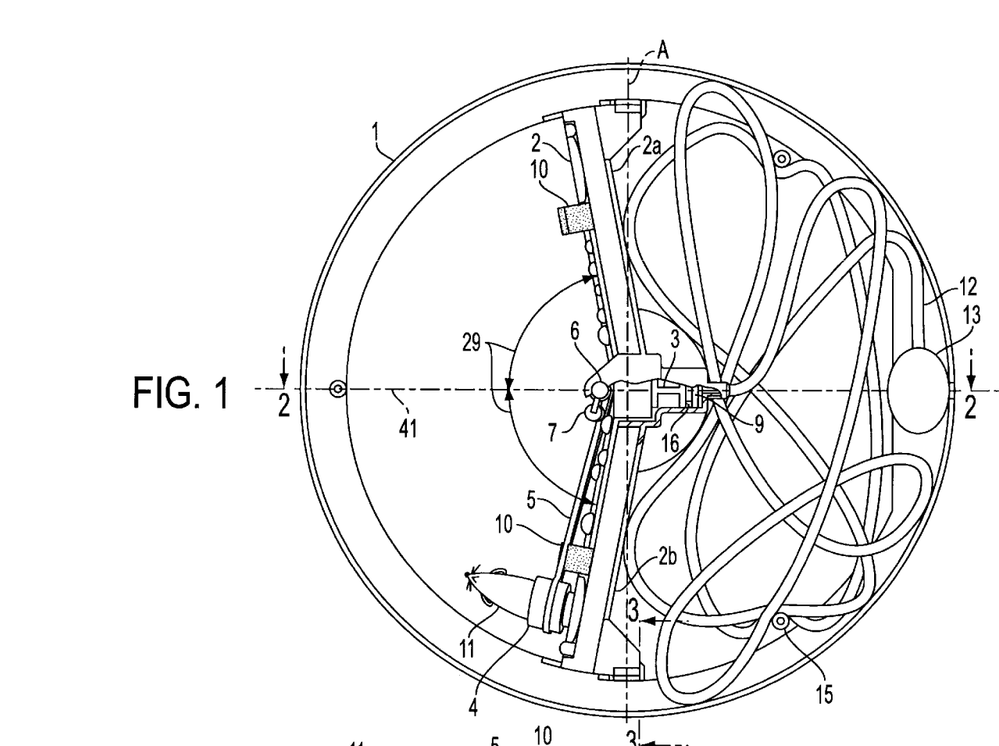
FIG. 1 is a bottom view of the invention with the base cover of the housing removed.
Figure 1A:
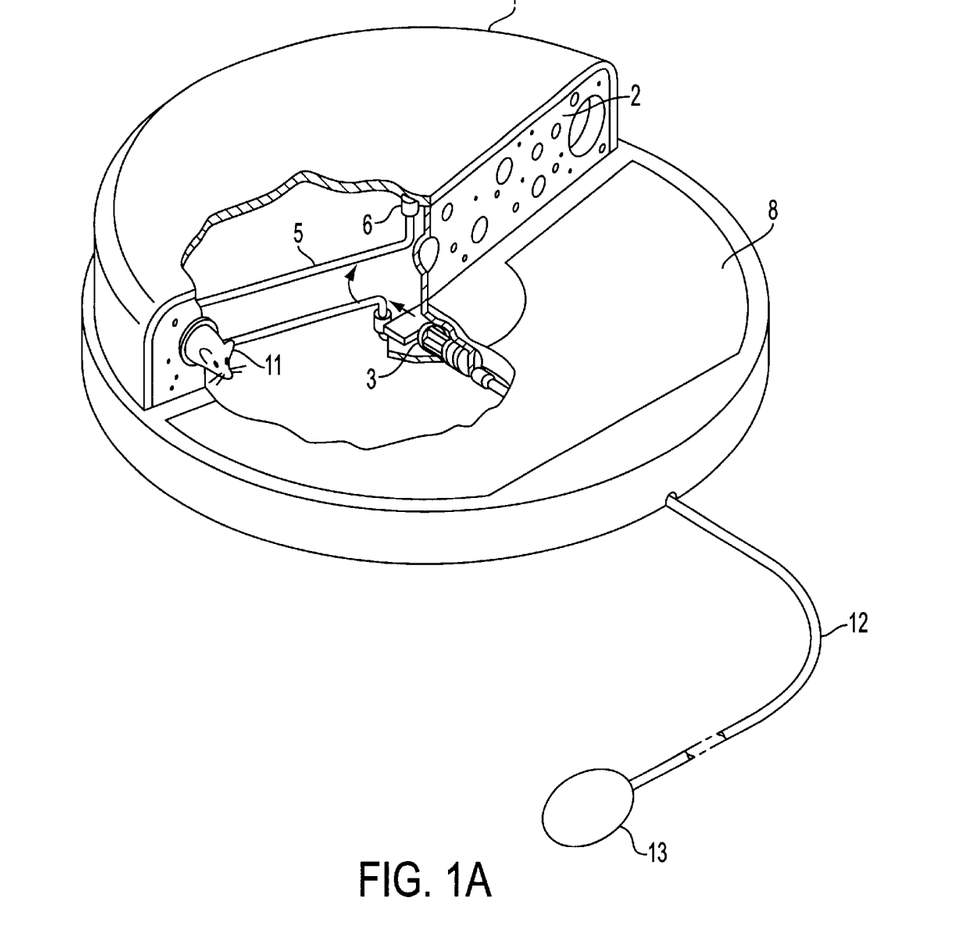
FIG. 1A is a perspective view of the invention with portions of certain components removed to show otherwise hidden components.

Referring to FIG. 1, the invention is shown in assembled and stored form with the flexible tube 12 and bulb 13 being in a stored position in the housing 1. Of course, for purposes of operation, a user will withdraw the bulb 13 from the hole 34 between the housing 1 and the base cover 14 over which the bulb 13 rests. The user will also withdraw from the housing 1 so much of the flexible tube 12 as is necessary for the user to locate himself or herself at a comfortable distance from the inventive toy.

Figure 9:
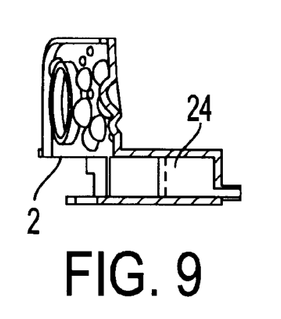
FIG. 9 is a cross-sectional view of FIG. 8 taken along section lines 9—9 in FIG. 8.
Figure 10:
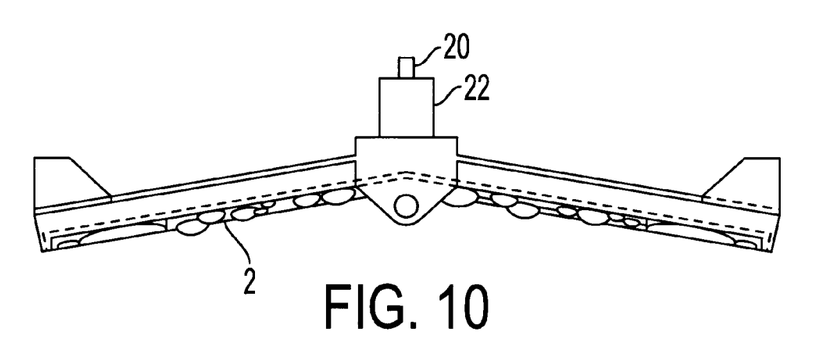
FIG. 10 is a bottom view of FIG. 8 taken along section lines 10—10.

The flexible tube 12 is attached at the other end from the bulb to a tubular projection 20 projecting from the side of the simulated cheese face 2, (see FIG. 10). The plunger pad 9 is attached to the inner surface of the outermost part of the projecting portion 22 of a simulated cheese face 2 from which projecting portion 22 the tubular projection 20 projects, (see FIGS. 2 and 10). The plunger pad 9 cushions the end of the plunger 3, (see FIG. 2), if it is pushed to a position in the chamber 24, (see FIG. 9), furthest to the right of centerline A shown in FIG. 1. The plunger 3 travels within the chamber 24 formed in part by the interior of projection 22, (see FIGS. 9 and 10). The plunger 3 is propelled in the chamber 24 toward the swing 5 by air flowing through the inflatable tube 12 when a user squeezes the bulb 13, (see FIG. 2). The plunger 3 contains, on one portion thereof, an O-ring 16 to insure an air tight seal between the plunger 3 and the walls of the chamber 24, thus, permitting the air to efficiently propel the plunger 3, (see FIG. 2).

Figure 13:
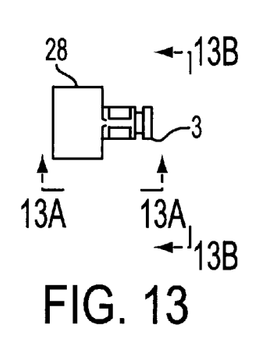
FIG. 13 is a plan view of the plunger.
Figure 13A:
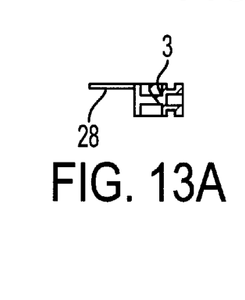
FIG. 13A is an elevation view of the plunger with a portion thereof shown in cross-section taken along section lines 13A—13A in FIG. 13.
Figure 13B:
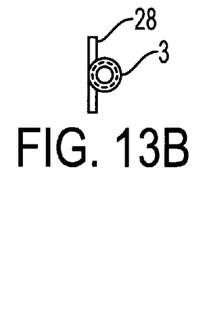
FIG. 13B is a side view of the plunger taken along section lines 13B—13B in FIG. 13.
Figure 14:
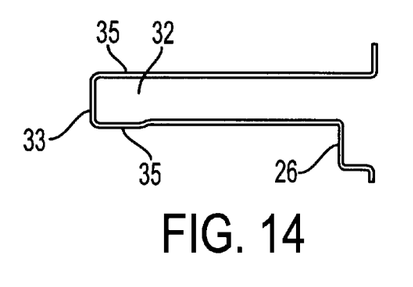
FIG. 14 is an elevation view of a wire swing to which a simulated two-headed mouse is attached.
Figure 15:
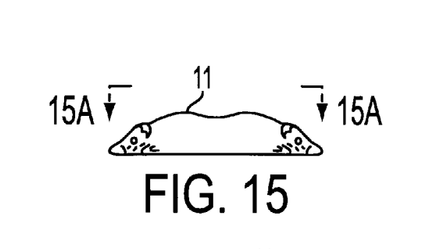
FIG. 15 is an elevation view of the simulated two-headed mouse.
Figure 15A:
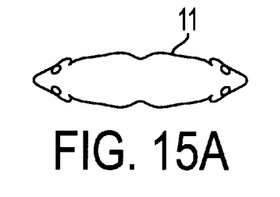
FIG. 15A is a plan view of FIG. 15 taken along section lines 15A—15A.

The plunger 3 propelled by the air contacts the swing 5 at a lower vertical portion thereof 26 with a flat plunger plate 28, (see FIGS. 13 and 14). The flat plunger plate 28, however, does not contact the vertical portion 26 of the swing 5 directly since the vertical portion 26 is surrounded by a shock-absorbing sleeve 7 to cushion the impact between the plunger plate 28 and the vertical portion 26 of the swing 5, (see FIG. 2).

The swing 5 holds the mouse support sleeve 4 in an outer region 32 surrounded by a vertical 33 and two horizontal 35 legs of the swing 5, (see FIG. 14). The mouse support sleeve 4 has three grooves in the middle of the length of its outer surface, allowing the swing to hold it securely against movement perpendicular to the swing. The three grooves correspond to the vertical 33 and two horizontal legs 35 of the swing 5. The mouse support sleeve 4 in turn holds the simulated two-headed mouse 11, (see FIG. 1). The swing 5 is held in the housing 1 by two pivots 6 so as to rotate about a fixed axis. The pivots 6 are arranged at the top and bottom of the housing 1 in a manner causing the swing 5, when held in the pivots 6, to assume an angle 37 to the horizontal such that the simulated two-headed mouse 11 is displaced vertically upward of a horizontal position of the swing 5, (see FIG. 2).

Figure 3:
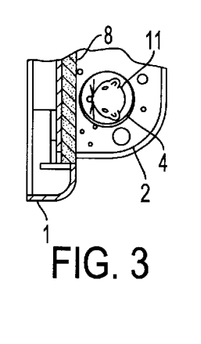
FIG. 3 is a sectional view of a portion of FIG. 1 taken along section lines 3—3.
Figure 4:
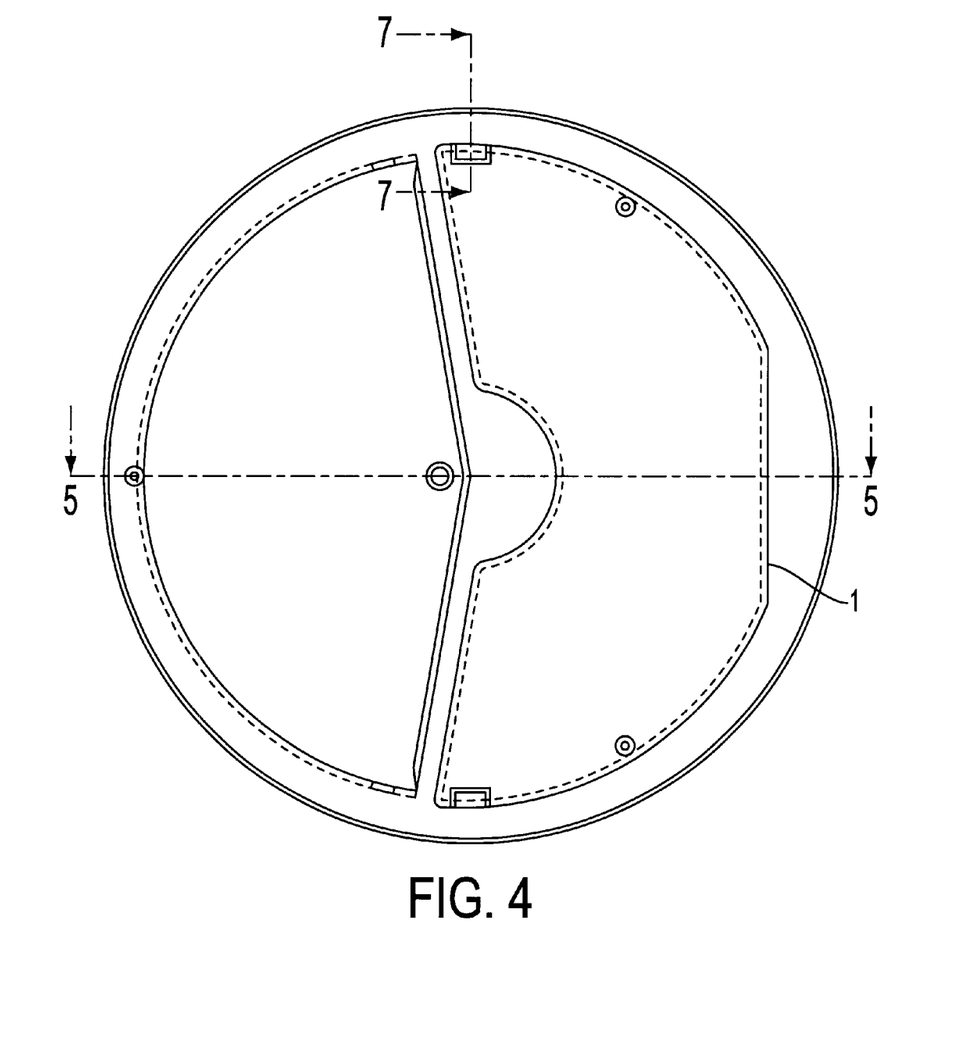
FIG. 4 is a plan view of the housing for the invention.
Figure 5:
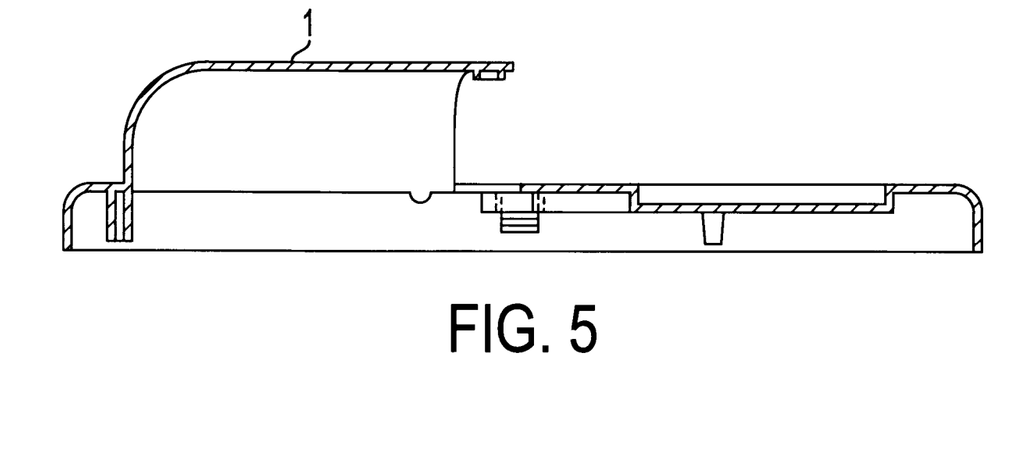
FIG. 5 is a cross-sectional view of FIG. 4 taken along section lines 5—5.

This angle 37 of the swing 5 with the horizontal causes the vertical 33 and the two horizontal 35 legs of the swing 5 to sweep out a surface of revolution, which can be described as a sector of an inclined disk, when the swing 5 rotates about its pivots 6. Due to the inclination of the revolution of the swing 5 with the horizontal, gravity will necessarily pull the swing to the lowest points in its arc of revolution, namely, the points at which each of the mouse faces of the simulated two-headed mouse 11 protrude from one of the two holes 30 in the simulated cheese face 2, (see FIGS. 1 and 3). Thus, the swing 5 will naturally fall by gravity to one of these two lowest points in its arc of rotation if it is not pushed away from them towards the highest point in its arc of revolution, which is at equal angles 29 to the sides 2a, 2b of the simulated cheese face 2, (see FIG. 1).

Figure 2:
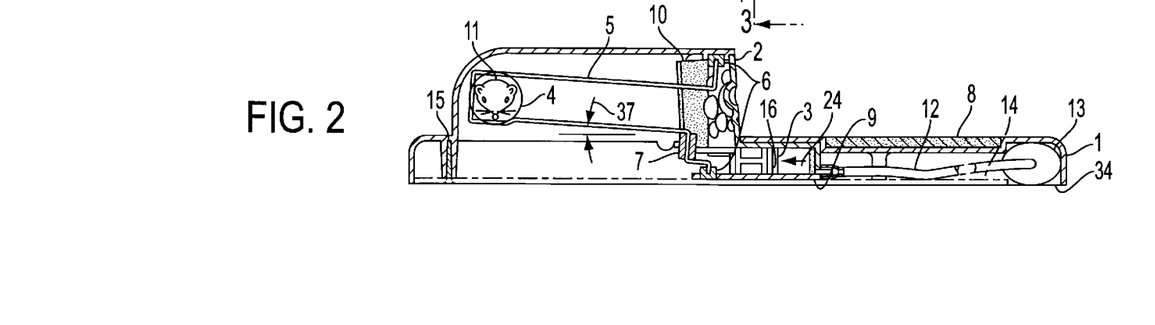
FIG. 2 is a cross-sectional view of FIG. 1 taken along section lines 2—2.
Figure 8:
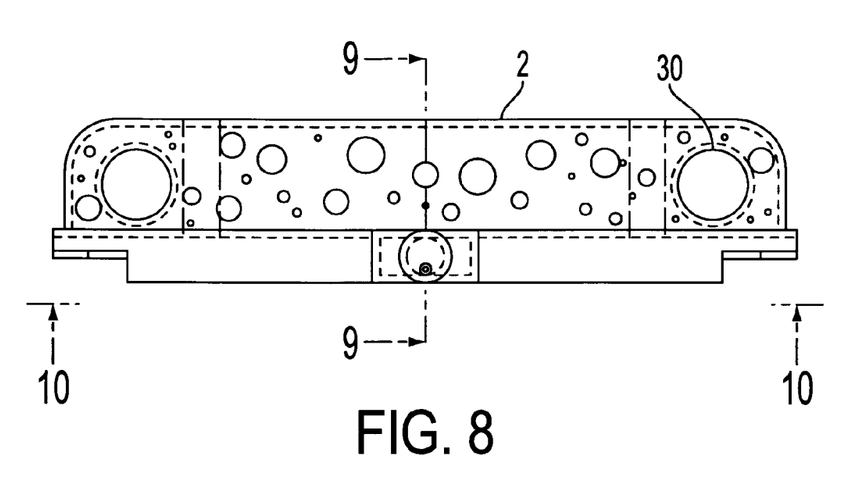
FIG. 8 is an elevation view of the simulated cheese face.
Figure 11:
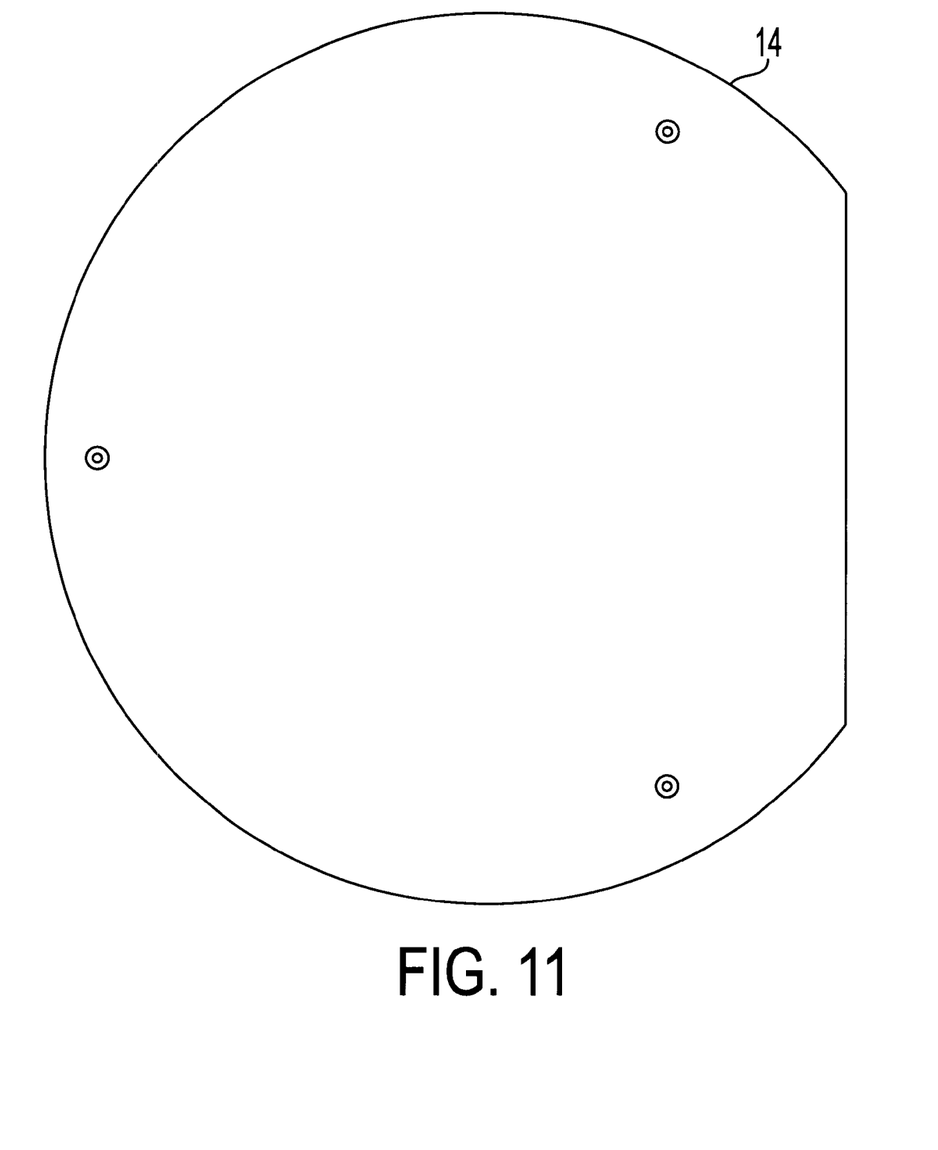
FIG. 11 is a plan view of the base cover of the invention.
Figure 12:
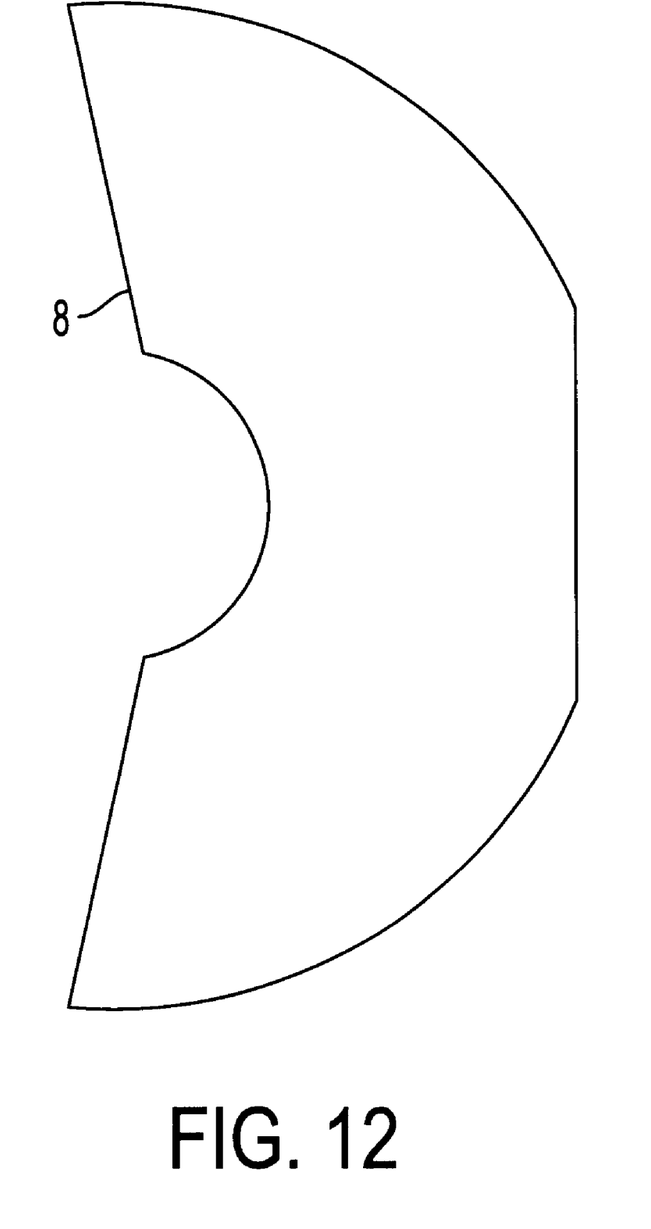
FIG. 12 is a plan view of the claw sharpening pad of the invention.

The housing 1 is attached to the base cover 14 by screws 15 or other appropriate fasteners, (see FIGS. 2 and 11). Cushions 10 are located on each interior side of the simulated cheese face 2 to stop the movement of the swing 5 at the furthest points of its rotation when one of the mouse faces of the simulated two-headed mouse 11 protrudes from one of the two holes 30 in the simulated cheese face 2, (see FIGS. 1 and 8).

In order to operate the invention, a user withdraws the bulb 13 from its stored position within the housing 1, and in addition, withdraws so much of the air tube 12 so that the user can stand at a comfortable distance from the inventive toy. In order for the operation of the toy to have the desired attractive effect on the cat, it is, of course, assumed that the cat is in the general vicinity of the toy so that the cat can notice the toy's operation.

Assuming this is true, the user then begins to squeeze upon the bulb 13. The air produced by such squeezing will, of course, travel through the air tube 12, propelling the plunger 3 away from the plunger pad 9 until the plunger plate 28 contacts the shock-absorbing sleeve 7. The force of the impact between the plunger plate 28 and the shock-absorbing sleeve 7 will force the swing to begin to rotate away from one of its extreme positions locating the simulated two-headed mouse 11 in one of the holes 30 of the simulated cheese face 2. The angle of the swing 5 with the horizontal guarantees that the simulated two-headed mouse 11 is located such that one of the two mouse heads protrudes from one of the two holes 30 due to the force of gravity on the swing 5 as previously explained.

Pressure of the plunger plate 28 against the shock-absorbing sleeve 7 will cause the swing 5 to reach a position 41 at equal angles 29 relative to both sides 2a, 2b of the cheese face 2 which, as previously explained, is the highest point on the arc of rotation of the swing 5. When the swing 5 reaches this equiangular position 41 and travels through it, the force of gravity will begin to cause the swing to fall towards the portion of the simulated cheese face 2 containing the hole 30 other than the hole 30 from which the simulated two-headed mouse 11 began to travel when the user began to squeeze the bulb 13. The falling swing 5, falling towards the second hole 30 in the simulated cheese face 2, will cause the shock-absorbing sleeve 7 to push against the plunger plate 28, thus causing the plunger 3 to be forced backward toward the plunger pad 9 until the simulated two-headed mouse 11 has completed one rotational motion, and one head of the simulated two-headed mouse 11 appears at the second hole 30 of the simulated cheese face 2.

The user, by continuously squeezing the bulb 13, with a certain minimum time interval between squeezes of the bulb 13, can cause a cyclic rotational motion of the simulated two-headed mouse 11, the cyclic rotational motion alternating in opposite directions. In such a case, opposite heads of the simulated two-headed mouse 11 will appear alternately at one hole 30 in the simulated cheese face 2 and then the other hole 30 in continuous succession and alternation, as long as the user presses upon the bulb 13.

The minimum time interval between squeezes of the bulb 13 previously referred to will produce the fastest cyclic rotational motion possible. As the time interval between squeezes of the bulb 13 increases from this minimum time interval the cyclic rotational motion will slow down until, at some very slow rate of squeezing the bulb 13, the simulated two-headed mouse 11 will not move at all.

If the user squeezes on the bulb 13 with greater rapidity than that producing the fastest cyclic rotational motion previously mentioned, the squeezes on the bulb 13 will be insufficient to cause the simulated two-headed mouse 11 to reach the equiangular position 41 at the highest point of the rotation of the two-headed mouse 11 and, thus, the simulated two-headed mouse 11 will appear intermittently only at one hole 30 in the simulated cheese face 2. As the user squeezes on the bulb 13 with ever greater rapidity, the time intervals between intermittent appearance of the simulated two-headed mouse 11 at the same hole 30 will grow ever shorter until a very high rate of squeezing on the bulb 13 will result in the simulated two-headed mouse 11 only vibrating at the same hole 13, but otherwise not moving, which should appear to a cat as a quivering mouse.

The simulated two-headed mouse 11 moves less and less as the user squeezes on the bulb 13 with increasing rapidity beyond the rapidity still producing the cyclic rotational motion since, with every release of the bulb 13, a suction force on the air in the air tube 12 is created. This suction force pulls the plunger 3 back from the motion of the plunger 3 in the other direction caused by the squeeze on the bulb 13 preceding its release. Thus, an increasing rapidity of squeezing on the bulb 13 will cause an increasing number of suction forces on the plunger 3 in a given time interval impeding to an increasing extent any forward pushing motion of the plunger 3 against the swing 5. This increasing impedance of the pushing motion of the plunger 3 against the swing 5 will result in the swing 5 and the simulated two-headed mouse 11 held by the swing 5 moving less and less, with the results described in the previous paragraph.

Figure 6:
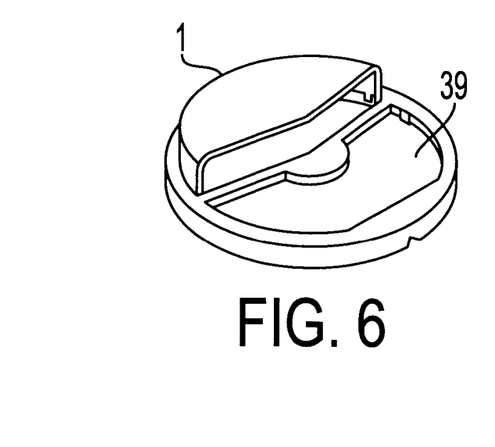
FIG. 6 is a perspective view of the housing.
Figure 7:
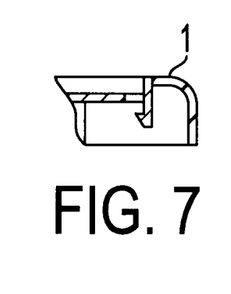
FIG. 7 is a detailed cross-section view of a portion of FIG. 4 taken along section lines 7—7 rotated by 90° clockwise, of a bracket to hold a simulated cheese face in the housing.

Such an alternating appearance of a mouse head at both holes 30, intermittent appearance of a mouse head at the same hole 30, or vibration of a mouse head at a hole 30, should be a continuous attraction to any cat happening to be nearby. The cat may also contribute to the motion of the simulated two-headed mouse 11 by pushing upon the then protruding mouse head with its paws, head or teeth, as it is quite likely to do once attracted by the simulated two-headed mouse 11. Such pushing by the cat will itself induce motion of the simulated two-headed mouse 11 without further intervention by the user, and, in all likelihood, the cat will probably continue to amuse itself with the toy for quite some time. The toy has a further attraction for the cat, since it contains a claw-sharpening pad 8 mounted in a recess 39 in the housing 1 opposite the simulated cheese face 2, (see FIGS. 2 and 6), for the cat to use.

Of course, the use of a simulated two-headed mouse 11 is not meant to be limiting in any way. A simulated mouse with a head and a tail may also be used since a cat may well be attracted even to a realistic mouse tail.

Insofar as the mouse head or tail protrudes from a hole 30 in the simulated cheese face 2, this presents an opportunity for the cat to pull upon the mouse head or tail and this could result in scratching or other damage to the mouse head or tail, while defeating the movement of the simulated mouse which is the basis for the continuing amusement potential of the toy. Such a problem is partially alleviated by the presence of the cushions 10. The cushions 10 have an elastic nature since they cushion and normally stop the movement of the swing 5 at its furthest points of rotation, as previously mentioned. Once a cat begins pulling on the simulated mouse, the swing 5 will further compress the cushion 10 on which it is resting. Upon release of the simulated mouse by the cat, the cushion 10 will expand, propelling the simulated mouse backward away from the hole. This elastic effect of the cushions 10 may be increased by replacing them with flat springs instead of the cushions which are made of spongy or foamy material. In any case, once a simulated mouse has become too worn because of contact with the teeth or claws of a cat, it can easily be replaced by removing the base cover 14 from the housing 1, removing the swing 5 from the pivots 6, removing the old simulated mouse from the swing 5, placing a new simulated mouse in the swing 5, setting the swing 5 back in the pivots 6, and reattaching the base cover 14 to the housing 1.

Figure 16:
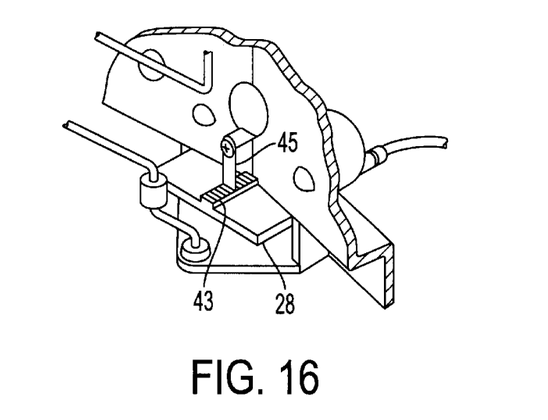
FIG. 16 is a perspective detail view of an alternate embodiment of the plunger.

Moreover, the realistic quality of the toy could be enhanced by the addition of a mechanism which will produce a sound simulating a sound made by a mouse when the plunger moves or otherwise vibrates. Such a mechanism could, for instance, comprise a grooved plate 43 mounted on the top of the plunger plate 28, (see FIG. 16). As the plunger plate 28 moves or vibrates, the end of a thin metal or other type of flexible and elastic plate 45 engaging the grooves in the grooved plate 43 would be moved back and forth, emitting a sound resembling the sound made by a mouse.

The fact that one simulated two-headed mouse 11 has heretofore been described as being held on the swing 5 should not be construed as limiting. It can easily be conceived that one or more additional simulated two-headed mice 11 could be held on the swing 5 at different one or more smaller radii from the two pivots 6 than the outermost two-headed mouse 11 by merely shaping the swing 5 to hold the additional simulated two-headed mice 11. Of course, for each additional simulated two-headed mouse 11 added to the swing 5, an additional pair of holes should be made in the simulated cheese face 2. Such a change in the mouse and cheese cat toy will simply have the result of the cat seeing two or more mice appearing at two or more holes in the simulated cheese face 2 at one time.

Other possible variations of the inventive cat toy involving more than one simulated mouse can easily be imagined if more than one swing 5 is included in the inventive toy. Examples of such variations are shown in FIGS. 17 and 18.

Figure 17:
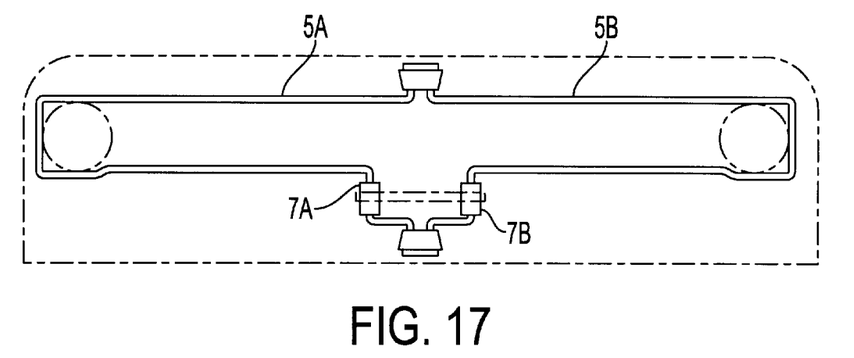
FIG. 17 is a schematic elevation view of a first alternate embodiment of the pivoting assembly of the invention capable of holding two one-headed mice.
Figure 18:
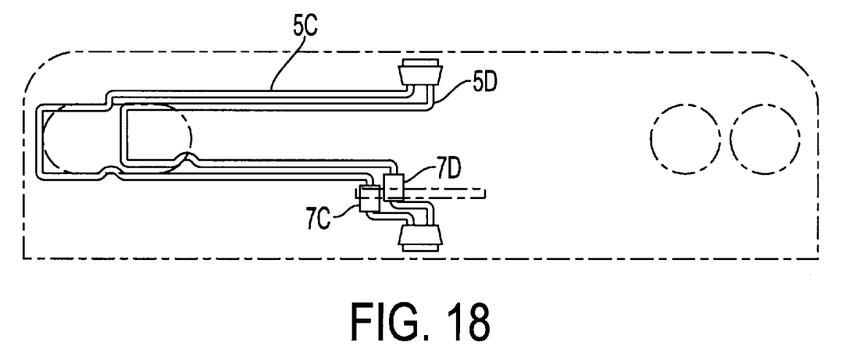
FIG. 18 is a schematic elevation view of a second alternate embodiment of the pivoting assembly of the invention capable of holding two two-headed mice.

In particular, FIG. 17 shows two swings 5a and 5b of equal size with pivot assemblies pivoted about separated pivot axes. One swing 5b has a larger diameter shock absorbing sleeve 7b than the other swing 5a, which has a shock absorbing sleeve 7a of smaller diameter. Since swing 5b has a larger diameter shock absorbing sleeve 7b, the shock absorbing sleeve 7b will be struck by the plunger before shock absorbing sleeve 7a, and thus, swing 5b will be set into rotating motion prior to swing 5a. This will allow swing 5b to traverse a greater angle than swing 5a and allow swing 5b to push swing 5a back to its original position, resulting in the simulated mouse held by swing 5b to be held in back of swing 5a, thus not appearing at the hole in which the mouse held by swing 5a appears. Depending on the duration and force with which the plunger subsequently contacts swing 5a, swing 5a and 5b can be pushed over to the other hole in which the mouse held by swing 5b will only appear or only the swing 5b will travel to the other hole in which the mouse held by it will appear, while the swing 5a will return to the hole from which it began to travel, thereby resulting in one mouse at each hole, the condition shown in FIG. 17.

Due to the fact that the simulated mouse held by each of the swings 5a and 5b cannot thus appear at both holes, only a simulated one-headed mouse is necessary for each swing. The different diameters of shock absorbing sleeve 7a and 7b are necessary to allow the simulated mice to appear at either hole. Equal diameter shock absorbing sleeves would result in the situation where both swings 5a and 5b would meet midway in their rotational travel between the holes in the simulated cheese face 2, colliding at that midway point and returning to the respective holes from which the swings began to move.

Although each swing 5a and 5b is shown as holding only one simulated mouse in FIG. 17, it may easily be conceived that each swing 5a and 5b can hold two or more simulated mice simply by slightly changing the contour of each swing to accommodate the one or more additional simulated mice at lesser radii than the first simulated mouse, and by adding holes in the simulated cheese face. Furthermore, although only a pair of swings of equal radii are shown in FIG. 17, it may easily be imagined that one or more pairs of swings, each member of an additional pair of swings being of equal radius to the radius of the other member of the pair, but of lesser radius than the first pair of swings, may be nested within the first pair of swings.

FIG. 18 shows a second alternate embodiment of the pivoting assembly of the invention. In this embodiment, there are also two swings 5c and 5d, but the swings 5c and 5d are of different radii, resulting in swing 5d nesting within swing 5c in comparison to swings 5a and 5d, which are of equal radii and thus, cannot nest one within the other. The swings 5c and 5d, however, are similar to swings 5a and 5b, in that one of the shock absorbing sleeves 7d on swing 5d is of larger diameter than the diameter of shock absorbing sleeve 7c on swing 5c, similar to swing shock absorbing sleeve 7b, which is of larger diameter than swing shock absorbing sleeve 7a. The larger diameter shock absorbing sleeve 7d thus guarantees that swing 5d will be contacted by the plunger before the plunger contacts shock absorbing sleeve 7c. The holes in FIG. 18 may be either separated or one elongated hole to accommodate the heads of the two simulated mice.

In addition, since the mice are at different radii with respect to the center of the simulated cheese face, and, thus, can appear at holes on both sides of the center of the simulated cheese face, two-headed simulated mice may be desirable, as previously described for the embodiment of the pivoting assembly with only one swing. Only one-headed mice, may be insufficient, in contrast to the case with the embodiment shown in FIG. 17, where one simulated mouse could not appear at holes on both sides of the center of the simulated cheese face. Although only two wire swings are shown nested, one within the other, in FIG. 18, it may easily be imagined that three or more wire swings may be used in a nested arrangement, the number of swings being limited only by the amount of radial distance from the center of the cheese face to the outermost wire swing and the size of the simulated mice desired to be used. In such a case, of course, the number of simulated two-headed mice may be increased accordingly.

Figure 19:
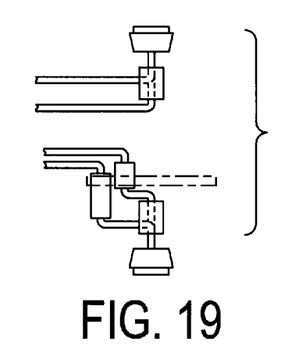
FIG. 19 is a schematic view of an alternate arrangement of pivots supporting multiple wire swings.

Finally, although FIG. 17 and FIG. 18 show an arrangement of pivots for the wire swings where the pivot axis of each wire swing is offset one from the other, FIG. 19 indicates an alternate arrangement of those pivots where the pivots are arranged such that they are on a common pivot axis.

Other variations of this invention will easily suggest themselves to persons of ordinary skill in the art. For instance, the bulb 13 and the air tubing 12 suitable for manual operation of the toy by a user may easily be conceived to be replaced by an automatic air pump which can be activated or deactivated by user and will thus cause the toy to operate automatically. Furthermore, the toy's attractiveness to a cat would probably be greatly enhanced if the simulated cheese face 2 could be imbued with an artificial cheese smell and the simulated two-headed mouse 11 could be imbued with an artificial smell resembling the odor of a mouse. Additionally, the simulated two-headed mouse 11 could be colored in two colors, one color for each half length of the mouse so that two different mice would appear to a cat to be emerging at each hole 30.

What is claimed is:

1. A toy for a cat comprising:
   at least one simulated mouse, each of said at least one simulated mouse having at least one head;
   a housing;
   at least one swing pivotally mounted within said housing, each of said at least one swing holding at least one of said at least one simulated mouse; and
   a plunger causing a movement of said at least one swing by contact with said at least one swing; and
   apparatus for delivering air to drive said plunger against said at least one swing.

2. A toy for a cat comprising:
   at least one simulated mouse, each of said at least one simulated mouse having at least one head;
   a housing;
   at least one swing pivotally mounted within said housing, each of said at least one swing holding at least one of said at least one simulated mouse;
   a plunger causing a movement of said at least one swing by contact with said at least one swing; and
   apparatus for delivering air to drive said plunger against said at least one swing; further comprising a simulated surface of a piece of cheese held by said housing, said simulated surface comprising two faces, said two faces meeting at a centerline of said housing.

3. A toy for a cat as claimed in claim 2, where in said simulated surface of said piece of cheese is imbued with an odor simulating a cheese odor.

4. A toy for a cat as claimed in claim 2, wherein said simulated surface of said piece of cheese has at least two holes therein positioned to allow each of said at least one simulated mouse to alternately appear in two of said at least two holes.

5. A toy for a cat as claimed in claim 2, wherein said simulated surface of said piece of cheese comprises a chamber for entry of air, said plunger traveling through said chamber.

6. A toy for a cat as claimed in claim 2, further comprising at least one cushion mounted on a wall of said simulated surface of said piece of cheese, said at least one cushion stopping rotation of said at least one swing about said pivotal mounting in a cushioned fashion.

7. A toy for a cat as claimed in claim 4, wherein each of said at least one swing pivots about an axis, which is angled from a line perpendicular to a surface on which said housing rests, such that portions of each of said at least one swing increase in vertical distance from said surface with increasing distance of said portions of each of said at least one swing from said axis.

8. A toy for a cat as claimed in claim 7, wherein said plunger and said at least one swing are dimensioned and arranged and said apparatus for delivering air delivers air during a first plurality of separated time intervals such that said plunger pushes upon said at least one swing for a first period of time during which said at least one swing moves from a first position where said at least one simulated mouse appears in at least a first of said at least two holes to a second position where said at least one simulated mouse is at equal angles to said two faces of said simulated surface of said piece of cheese, and said at least one swing pushes upon said plunger for a second period of time during which said at least one swing moves from said second position to a third position where said at least one simulated mouse appears in at least a second of said at least two holes, producing a first rotation of said at least one simulated mouse from said first position to said third position.

9. A toy for a cat as claimed in claim 8, wherein said apparatus for delivering air delivers air during a second plurality of separated time intervals, producing at least one second rotation of said at least one simulated mouse from said third position to said first position.

10. A toy for a cat as claimed in claim 9, wherein said at least one simulated mouse moves through at least one additional first rotation from said first position to said third position.

11. A toy for a cat as claimed in claim 7, wherein said plunger and said at least one swing are dimensioned and arranged and said apparatus for delivering air delivers air during a first plurality of separated time intervals such that said plunger pushes upon said at least one swing for a first period of time during which said at least one swing moves from a first position where said at least one simulated mouse appears in at least one of said at least two holes to a second position where said at least one simulated mouse is at unequal angles to said two faces of said simulated surface of said piece of cheese, and said at least one swing pushes upon said plunger for a second period of time during which said at least one swing moves from said second position to said first position, producing a rotation of said at least one simulated mouse from said first position to said second position and back to said first position.

12. A toy for a cat as claimed in claim 11, wherein said apparatus for delivering air delivers air during a second plurality of separated time intervals, producing at least one additional rotation of said at least one simulated mouse from said first position to said second position and back to said first position.

13. A toy for a cat as claimed in claim 7, wherein said plunger and said at least one swing are dimensioned and arranged and said apparatus for delivering air delivers air during a plurality of separated time intervals such that said plunger vibrates against said at least one swing, causing said at least one simulated mouse to vibrate in at least one of said at least two holes.

14. A toy for a cat as claimed in claim 1, further comprising a base cover removably attached to said housing.

15. A toy for a cat as claimed in claim 14, wherein said at least one simulated mouse may be replaced when worn or damaged by removing said base cover from said housing, removing said swing from said pivotal mounting, removing said at least one simulated mouse from said swing, placing at least one new simulated mouse in said swing, resetting said swing in said pivotal mounting, and reattaching said base cover to said housing.

16. A toy for a cat as claimed in claim 1, wherein each of said at least one swing pivots about an axis, which is angled from a line perpendicular to a surface on which said housing rests, such that portions of each of said at least one swing increase in vertical distance from said surface with increasing distance of said portions of each of said at least one swing from said axis.

17. A toy for a cat as claimed in claim 1, further comprising a claw-sharpening pad mounted on said housing.

18. A toy for a cat as claimed in claim 1, wherein said apparatus for delivering air comprises a bulb and flexible tubing attached to said bulb.

19. A toy for a cat as claimed in claim 1, further comprising a cushioning sleeve on said at least one swing for cushioning an impact of said plunger on said at least one swing when said plunger contacts said at least one swing.

20. A toy for a cat as claimed in claim 1, further comprising a mechanism for causing a sound simulating a sound made by a mouse, said mechanism causing said sound when said plunger moves or vibrates.

21. A toy for a cat as claimed in claim 1, wherein any of said at least one simulated mouse is imbued with an odor simulating a mouse odor.

22. A toy for a cat comprising:
at least one simulated mouse, each of said at least one simulated mouse having at least one head;
a housing;
at least one swing pivotally mounted within said housing, each of said at least one swing holding at least one of said at least one simulated mouse;
a plunger causing a movement of said at least one swing by contact with said at least one swing; and
apparatus for delivering air to drive said plunger against said at least one swing, wherein any of said at least one simulated mouse is colored in two colors, a first of said two colors extending from a first end of any of said at least one simulated mouse to a middle of a length of any of said at least one simulated mouse and a second of said two colors extending from said middle to a second end of any of said at least one simulated mouse.

23. A toy for a cat as claimed in claim 1, wherein said at least one simulated mouse comprises at least one simulated one-headed mouse.

24. A toy for a cat as claimed in claim 1, wherein said at least one simulated mouse comprises at least one simulated two-headed mouse.

25. A toy for a cat as claimed in claim 1, wherein said at least one swing comprises one swing.

26. A toy for a cat as claimed in claim 1, wherein said at least one swing comprises at least two swings, a first swing and a second swing of said at least two swings having outermost radii from a centerline of said housing such that said outermost radius of said first swing is equal to said outermost radius of said second swing.

27. A toy for a cat comprising:
at least one simulated mouse, each of said at least one simulated mouse having at least one head;
a housing;
at least one swing pivotally mounted within said housing, each of said at least one swing holding at least one of said at least one simulated mouse;
a plunger causing a movement of said at least one swing by contact with said at least one swing; and
apparatus for delivering air to drive said plunger against said at least one swing,
wherein said at least one swing comprises at least two swings, a first swing and a second swing of said at least two swings having outermost radii from a centerline of said housing such that said outermost radius of said first swing is equal to said outermost radius of said second swing, and
further comprising a cushioning sleeve on each of said first swing and said second swing, said cushioning sleeve on said first swing having a larger diameter than said cushioning sleeve on said second swing, said cushioning sleeves cushioning an impact of said plunger on said first swing and said second swing.

28. A toy for a cat as claimed in claim 27, further comprising a simulated surface of a piece of cheese held by said housing, said simulated surface of said piece of cheese comprising two faces, said two faces meeting at a centerline of said housing, said simulated surface of said piece of cheese having at least two holes therein, two of said at least two holes being positioned to allow a first simulated mouse held by said first swing and a second simulated mouse held by said second swing to intermittently appear in a respective one of said two holes.

29. A toy for a cat as claimed in claim 28, wherein said first swing pivots about a first axis and said second swing pivots about a second axis, said first axis and said second axis being angled from a line perpendicular to a surface on which said housing rests such that portions of said first swing and said second swing increase in vertical distance from said surface with increasing distance of said portions of said first swing and said second swing from said first axis and from said second axis, respectively.

30. A toy for a cat as claimed in claim 29, wherein said plunger and said first swing and said second swing are dimensioned and arranged and said apparatus for delivering air delivers air during a first plurality of separated time intervals, such that said plunger pushes upon said first swing for a first period of time and said plunger pushes upon said second swing for a second period of time, during which first period of time said first swing moves from a first position where said first simulated mouse held by said first swing appears in a first of said two holes to a second position where said simulated first mouse is at equal angles to said two faces of said simulated surface of said piece of cheese, and during which said second period of time said second swing moves from a third position where said second simulated mouse held by said second swing appears in a second of said two holes to a fourth position where said second simulated mouse is at unequal angles to said two faces of said simulated surface of said piece of cheese, and said first swing pushes upon said plunger for a third period of time during which said first simulated mouse moves from said second position to a fifth position where said first simulated mouse contacts said second simulated mouse and during which said third period of time said second simulated mouse moves from said fourth position to said third position.

31. A toy for a cat as claimed in claim 29, wherein said plunger and said first swing and said second swing are dimensioned and arranged and said apparatus for delivering air delivers air such that said first simulated mouse held by said first swing can appear at a first of said two holes or said first simulated mouse can be positioned behind said second simulated mouse held by said second swing when said second simulated mouse appears at a second of said two holes and such that said second simulated mouse can appear at said second of said two holes or can be positioned behind said first simulated mouse when said first simulated mouse appears at said first of said two holes.

32. A toy for a cat as claimed in claim 1, wherein said at least one swing comprises at least two swings, each adjacent pair of said at least two swings being nested within each other.

33. A toy for a cat as claimed in claim 32, further comprising a cushioning sleeve on each of said at least two swings, each of said cushioning sleeves being of a different diameter than a remainder of said cushioning sleeves.

34. A toy for a cat as claimed in claim 33, further comprising a simulated surface of a piece of cheese held by said housing, said simulated surface comprising two faces, said two faces meeting at a centerline of said housing, said simulated piece of cheese having at least two holes therein positioned to allow each of said at least one simulated mouse to alternately appear in two of said at least two holes, wherein said plunger and said at least two swings are dimensioned and arranged and said apparatus for delivering air delivers air such that each of said at least one simulated mouse held by a first swing of said at least two swings may appear at a first hole of said at least two holes, said first hole being on a first face of said two faces, said appearance of said each of said at least one simulated mouse being when any of said at least one simulated mouse held by a second swing of said at least two swings appears at a second hole of said at least two holes, said second hole being on said first face or on a second face of said two faces.

35. A toy for a cat comprising:
at least one simulated mouse, each of said at least one simulated mouse having at least one head;
a housing;
at least one swing being mounted within said housing, each of said at least one swing being separately pivotally mounted and holding at least one of said at least one simulated mouse;
a plunger causing a movement of said at least one swing by contact with said at least one swing; and
apparatus for delivering air to drive said plunger against said at least one swing.

36. A toy for a cat as claimed in claim 35, further comprising a base cover removably attached to said housing.

37. A toy for a cat as claimed in claim 36, wherein said at least one simulated mouse may be replaced when worn or damaged by removing said base cover from said housing, removing said swing from said pivotal mounting, removing said at least one simulated mouse from said swing, placing at least one new simulated mouse in said swing, resetting said swing in said pivotal mounting, and reattaching said base cover to said housing.

38. A toy for a cat as claimed in claim 35, wherein each of said at least one swing pivots about an axis, which is angled from a line perpendicular to a surface on which said housing rests, such that portions of each of said at least one swing increase in vertical distance from said surface with increasing distance of said portions of each of said at least one swing from said axis.

39. A toy for a cat as claimed in claim 35, further comprising a claw-sharpening pad mounted on said housing.

40. A toy for a cat as claimed in claim 35, wherein said apparatus for delivering air comprises a bulb and flexible tubing attached to said bulb.

41. A toy for a cat as claimed in claim 35, further comprising a cushioning sleeve on said at least one swing for cushioning an impact of said plunger on said at least one swing when said plunger contacts said at least one swing.

42. A toy for a cat as claimed in claim 35, further comprising a mechanism for causing a sound simulating a sound made by a mouse, said mechanism causing said sound when said plunger moves or vibrates.

43. A toy for a cat as claimed in claim 35, wherein any of said at least one simulated mouse is imbued with an odor simulating a mouse odor.

44. A toy for a cat as claimed in claim 35, wherein said at least one simulated mouse comprises at least one simulated one-headed mouse.

45. A toy for a cat as claimed in claim 35, wherein said at least one simulated mouse comprises at least one simulated two-headed mouse.

46. A toy for a cat as claimed in claim 35, wherein said at least one swing comprises one swing.

47. A toy for a cat as claimed in claim 35, wherein said at least one swing comprises at least two swings, a first swing and a second swing of said at least two swings having outermost radii from a centerline of said housing such that said outermost radius of said first swing is equal to said outermost radius of said second swing.

* * * * *